United States Patent
Ting et al.

(10) Patent No.: US 8,392,604 B2
(45) Date of Patent: Mar. 5, 2013

(54) PEER TO PEER BROWSER CONTENT CACHING

(75) Inventors: Chyr-Song Ting, San Marcos, CA (US); Chyr-Chong Ting, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1009 days.

(21) Appl. No.: 11/869,466

(22) Filed: Oct. 9, 2007

(65) Prior Publication Data
US 2009/0094347 A1 Apr. 9, 2009

(51) Int. Cl.
*G06F 15/273* (2006.01)
*G06F 15/16* (2006.01)
*G06F 7/00* (2006.01)

(52) U.S. Cl. .................. 709/238; 709/203; 707/622

(58) Field of Classification Search ............. 709/238
See application file for complete search history.

(56) References Cited

U.S. PATENT DOCUMENTS

| | | | |
|---|---|---|---|
| 6,854,018 B1 * | 2/2005 | Li et al. | 709/240 |
| 7,117,260 B2 * | 10/2006 | Bimson et al. | 709/223 |
| 7,752,394 B1 * | 7/2010 | Rajkumar et al. | 711/133 |
| 7,783,777 B1 * | 8/2010 | Pabla et al. | 709/238 |
| 2005/0050028 A1 * | 3/2005 | Rose et al. | 707/3 |
| 2006/0080454 A1 * | 4/2006 | Li | 709/231 |
| 2007/0038743 A1 * | 2/2007 | Hellhake et al. | 709/224 |
| 2007/0130361 A1 * | 6/2007 | Li | 709/231 |
| 2007/0220160 A1 * | 9/2007 | Seidel | 709/230 |
| 2007/0288656 A1 * | 12/2007 | Liang et al. | 709/245 |
| 2008/0021981 A1 * | 1/2008 | Kumar et al. | 709/219 |
| 2008/0028041 A1 * | 1/2008 | Jung et al. | 709/218 |
| 2008/0201404 A1 * | 8/2008 | Lazovsky et al. | 709/202 |

\* cited by examiner

*Primary Examiner* — Guang Li
(74) *Attorney, Agent, or Firm* — James J. DeCarlo; Greenberg Traurig

(57) ABSTRACT

Facilitating browser access to cached content available from a peer to peer network by receiving a request for content from a content server, receiving from the content server content metadata indicating that the requested content is available from at least one alternative user computing device via a peer to peer network, instantiating on the user computing device a browser helper application which facilitates access to the peer to peer network, and receiving from the content server a lookup table comprising a list of alternative user computing devices from which the requested content is available. The lookup table can be parsed to select an alternative user computing device from which the content, or portions thereof, is requested. The received content can the be stored for later use or presented to the user via the browser.

18 Claims, 4 Drawing Sheets

PEER TO PEER BROWSER CONTENT CACHING

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of information technology, and more specifically provides a system and methods through which content for display by a network browsing application can be cached which facilitates expedited content retrieval.

BACKGROUND

Traditional peer to peer services allow an individual to give other users access to the individual's digital picture, video, or music files. As the files are downloaded by the other users, these users become sources of the files for subsequent users. In addition, some peer to peer services split files into a plurality of parts for distribution, and allow users to simultaneously obtain different parts from different sources.

SUMMARY

The instant disclosure is directed to a system and method through which content displayable by a network browsing application (referred to herein as a "browser") can be distributed and retrieved using a peer-to-peer model. As used herein, the term "browser" is intended to encompass application software, running on a computing device, which is at least capable of interpreting information stored using the Hypertext Markup Language ("HTML"), the Extensible Markup Language ("XML"), or other language derived from the Standardized Generalized Markup Language. Examples of such browsers include, but are not limited to, Internet Explorer distributed by Microsoft Corporation of Redmond, Wash.; Firefox distributed by the Mozilla Foundation of Mountain View, Calif.; Camino distributed by the Camino Project; and Opera distributed by Apple Computer, Inc. of Cupertino, Calif. As used herein, the term computing device comprises one or more physical devices, each device comprising at least one central processing unit, arithmetic logic unit, or other such processor and a memory. Examples of such computing devices include, but are not limited to, cellular telephones, personal digital assistants, portable media players, laptop computers, desktop computers, servers, routers, bridges, gateways, and the like.

Additional features and advantages will be set forth in the description which follows, and in part will be apparent from this disclosure, or may be learned by practice of the disclosed peer to peer browser content caching system and method. The objectives and other advantages will be realized and attained by the structure particularly pointed out in this written description, including any claims contained herein and the appended drawings.

When a user browses content available via the Internet, an Intranet, or other content source, the user typically requests information directly from a server. By way of example, a user who uses a browser to visit the well-known Yahoo! web portal (http://www.yahoo.com) will typically obtain the content comprising the Yahoo! web portal directly from a server provided by Yahoo! Inc. In some instances, larger organizations employ "caching" servers, which temporarily store frequently accessed content inside the organization's network, thereby giving users faster access to the information. However, the content stored by the caching servers is only available to users inside the corporate network. The instant system and method tracks the users or servers to which such browser-viewable content has been provided, and allows the user to obtain the content from others who have recently obtained the content from the server. In some embodiments, a server operator or content distributor may include one or more tags, metadata, or other identifiers in, or otherwise associate the identifiers with, the content whereby the content distributor can specify that the content should only be obtained from the content provider, or set a timeout period after which content downloaded or otherwise obtained by other users is considered to have "expired". By way of example, without limitation, a content distributor may identify the content displayed on the main page of a news portal as expiring after 2 minutes, thereby reducing the likelihood that visitors will obtain older cached data rather than the latest breaking news. By contrast, the same content distributor may specify that a pre-recorded video clip expires after five days, as the video clip itself is not likely to change over time.

Some embodiments may comprise a content module, the content module comprising information concerning where in a network content can be made available, and a lookup table, the lookup table comprising a set of alternative user computing devices which have requested at least a subset of the plurality of content; and, a download module for download a browser helper application, the browser helper application capable of receiving a request, from a user, for content from the content server, receiving from the content server at least a subset of the lookup table, parsing the received at least a subset of the lookup table to identify at least one of the plurality of alternative user computing devices from which the requested content is available, and initiating retrieval of the requested content from the at least one identified alternative user computing devices. In some embodiments, the first the first browser helper application may further be capable of receiving a request, from a second browser helper application, for at least a portion of content available from an alternative user computing device and facilitating the transfer of the requested at least a portion of content. In some embodiments, the lookup table may comprise the Internet Protocol address of the set of alternative user computing devices requesting content, and the browser helper application further applying at least one user defined rule to the received at least a subset of the lookup table, and the user defined rules may be used to limit the set of alternative user computing devices from which content can be requested based on the Internet Protocol address associated with the alternative user computing devices. In some embodiments, the lookup table may further comprise geolocation information associated with at least a subset of the lookup table entries, and the user defined rules may limit the set of alternative user computing devices from which content can be requested based on the geolocation information associated with the alternative user computing devices. In some embodiments, the lookup table may further comprise the time at which the content was requested by at least a subset of the plurality of alternative content sources, at least a subset of the content available from the content server having associated therewith an expiration period; and the browser helper application being capable of parsing the received lookup table to remove those alternative content sources having requested the content outside the expiration period.

Some embodiments may comprise a method comprising receiving from a user via a browser running on a user computing device a request for content from a content server; receiving from the content server one or more content identifiers indicating that the requested content is available from at least one alternative user computing device via a peer to peer network and a lookup table comprising a list of alternative user computing devices from which the requested content is available; parsing the lookup table to select at least one of the alternative user computing devices; requesting at least a portion of the requested content from the selected at least one alternative user computing devices; and, presenting the content received from the at least one alternative user computing device to the user. In some embodiments, the parsing may further comprise applying at least one rule to the lookup table, and the at least one rule may comprise rules based on the geographic location of the alternative user computing devices. Such rules may be user defined, defined by a distributor of the browser helper application, defined by a third party, or the like. In some embodiments, the parsing may further comprise selecting a plurality of alternative user computing devices, at least a portion of the content being requested from at least a subset of the selected plurality of alternative user computing devices, and rebuilding the content from the received content portions. Some embodiments may further comprise presenting the rebuilt content to the user via the browser running on the user computing device, the lookup table comprising only those alternative user computing devices which obtained the requested content less than a fixed period of time ago. In some embodiments, at least a portion of the content may be requested from the server if at least a portion of the content is unavailable from the at least a subset of the plurality of alternative user computing devices.

Although described herein in terms of systems and methods generally, some embodiments can be implemented as computer program process code comprising a plurality of modules. Such modules may comprise one or more instructions, interpretable by a processor, for performing the functions associated with the module. Such modules may be distributed on computer readable media; downloaded from a server or other computing device; built into firmware, Basic Input/Output System (BIOS); or the like. Although the functionality may be defined in terms of discrete modules, it should be apparent to one skilled in the art that the functionality may be combined into a single module, or divided among additional modules, without departing from the spirit or the scope of the disclosed system and method.

Some embodiments comprise computer program process code, tangibly stored on a computer readable medium, the computer program process code comprising instructions interpretable by a processor, the instructions comprising: receiving, by a content server, a content request from a first user computing device; logging an address of the first user computing device in a lookup table and a time at which the request is received; and determining whether the requested content is cache enabled and sending the requested content from the content server to the first user computing device if the requested content is not cache enabled, and, if the requested content is cache enabled: determining from the lookup table a set of alternative user computing devices having copies of the requested content; and, transmitting the set of alternative user computing devices to the first user computing device. In some embodiments, at least a subset of the alternative user computing devices in the list of alternative user computing devices have at least one of geolocation information, an Internet Protocol address, and an expiration associated therewith. In some embodiments, the set of alternative user computing devices transmitted to the first user computing device containing only those alternative user computing devices whose content has not expired. Some embodiments include computer program process code wherein the set of alternative user computing devices is selected, at least in part, based on the geographic proximity to the user computing device.

Some embodiments comprise computer program process code, tangibly stored on a computer readable medium, the computer program process code comprising instructions interpretable by a processor, the instructions comprising receiving, by a browser helper application running on a user computing device, a list of alternative user computing devices; selecting from the list of alternative user computing devices at least one second user computing device; initiating a peer to peer connection with the at least one second user computing device; requesting at least a portion of the content from the at least one second user computing device; and, presenting the content to a user of the first user computing device upon receipt of at least a portion of the content from the at least one second user computing device. In some embodiments, at least a subset of the alternative user computing devices in the list of alternative user computing devices may have at least one of geolocation information, an Internet Protocol address, and an expiration associated therewith. Some embodiments further comprise instructions for applying a set of rules to the list of alternative user computing devices, and the rules may further comprise comprising instructions for selecting, based on at least one of the Internet Protocol address or the geolocation information, a set of trusted alternative user computing devices, and the at least one second user computing device being selected from the set of trusted alternative user computing devices. In some embodiments, the second user computing device may be selected from those alternative user computing devices whose content has not expired. Some embodiments further comprise instructions for monitoring the progress of the receipt of the requested at least a portion of the content; terminating the request if the progress slows beyond a predefined rate; and, requesting the at least a portion of the content from the content server if no second user computing devices are available.

It is to be understood that both the foregoing general description and the following detailed description are exemplary and explanatory and are intended to provide further explanation of the disclosed peer to peer browser content caching system and method.

BRIEF DESCRIPTION OF THE DRAWINGS

The accompanying drawings, which are included to provide a further understanding of the disclosed peer to peer browser content caching system and method and are incorporated in and constitute a part of this specification, illustrate various embodiments and, together with the description, serve to explain the principles of at least one embodiment of the disclosed peer to peer browser content caching system and method.

In the drawings.

DETAILED DESCRIPTION

Reference will now be made in detail to embodiments of the disclosed peer to peer browser content caching system and method, examples of which are illustrated in the accompanying drawings.

Figure 1:
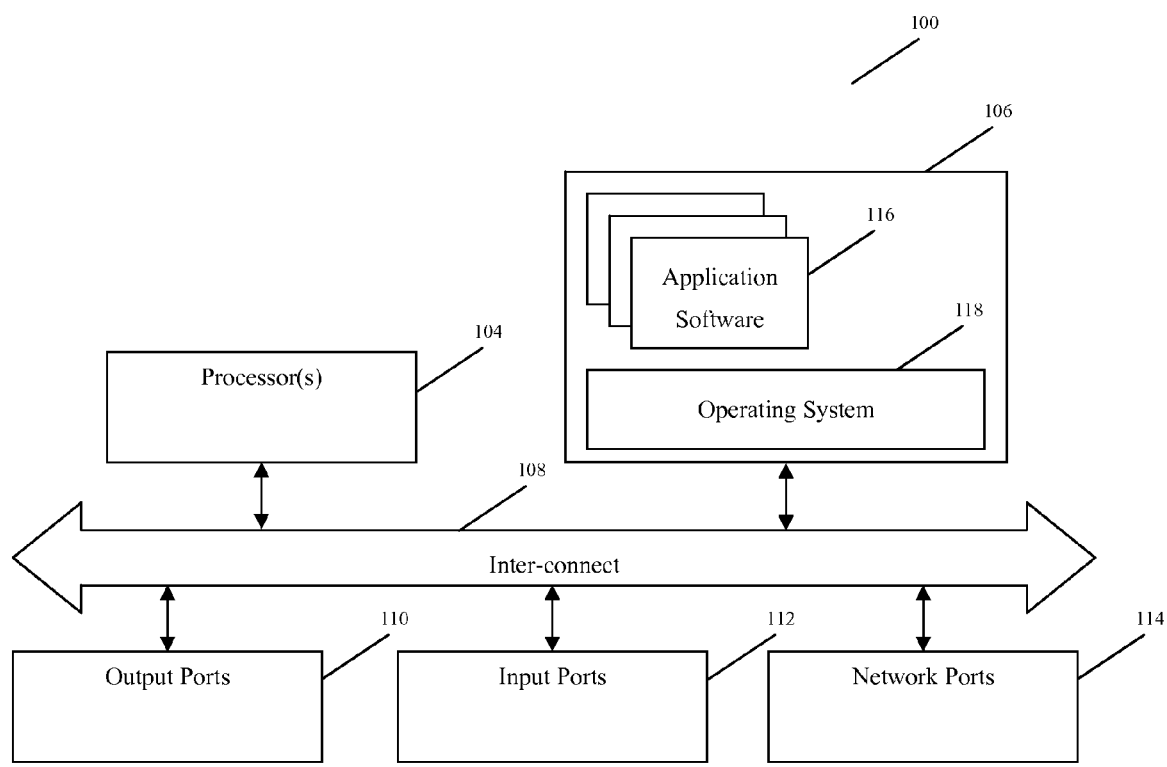
FIG. 1 is a block diagram of a user computing device.

FIG. 1 is a block diagram illustrating components of an exemplary user computing device 100. Such exemplary user computing devices can include, but are not limited to, cellular telephones, laptop computers, desktop computers, personal digital assistants, portable music players, and the like.

In some embodiments, user computing device 100 comprises an inter-connect 108 (e.g., bus, system core logic, or the like), which facilitates communication between the various components of user computing device 100 such as, without limitation, processor(s) 104 and memory 106. Furthermore, interconnect 108 can allow processor 104 and/or memory 106 to communicate with peripheral devices, including those connected via input ports 112 and output ports 110. Input ports 112 and output ports 110 can communicate with I/O devices such as mice, keyboards, modems, network interfaces, printers, scanners, video cameras and other devices. In addition, output port 110 can further communicate with a display.

Interconnect 108 may also comprise one or more buses connected to one another through various bridges, controllers and/or adapters. In some embodiments, input ports 112 and output ports 110 can include a USB (Universal Serial Bus) adapter for controlling USB peripherals, and/or an IEEE-1394 bus adapter for controlling IEEE-1394 peripherals. Inter-connect 108 can also include one or more network ports 114, through which the user computing device can be communicatively coupled with a communication network.

In some embodiments, memory 106 may include ROM (Read Only Memory), and volatile RAM (Random Access Memory) and non-volatile memory, such as hard drive, flash memory, computer-readable media, or the like. Volatile RAM is typically implemented as dynamic RAM (DRAM), which requires continuous power to refresh or maintain the data in the memory. Non-volatile memory is typically a magnetic hard drive, flash memory, a magneto-optical drive, or an optical drive (e.g., a DVD RAM), or other type of memory system which maintains data even after power is removed from the system. Computer-readable media can include, without limitation, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), or the like.

In some embodiments, memory 106 can be a local device coupled directly to the other components or modules in the data processing system. A non-volatile memory that is remote from the system, such as a network storage device coupled to the data processing system through a network interface such as a modem or Ethernet interface, can also be used.

In some embodiments, routines executed to implement one or more embodiments may be implemented as part of an operating system 118 or a specific application, component, program, object, module or sequence of instructions, collectively referred to herein as application software 116. Application software 116 typically comprises one or more instruction sets that can be executed by microprocessor 104 to perform operations necessary to execute elements involving the various aspects of the methods and systems described herein.

Figure 2:
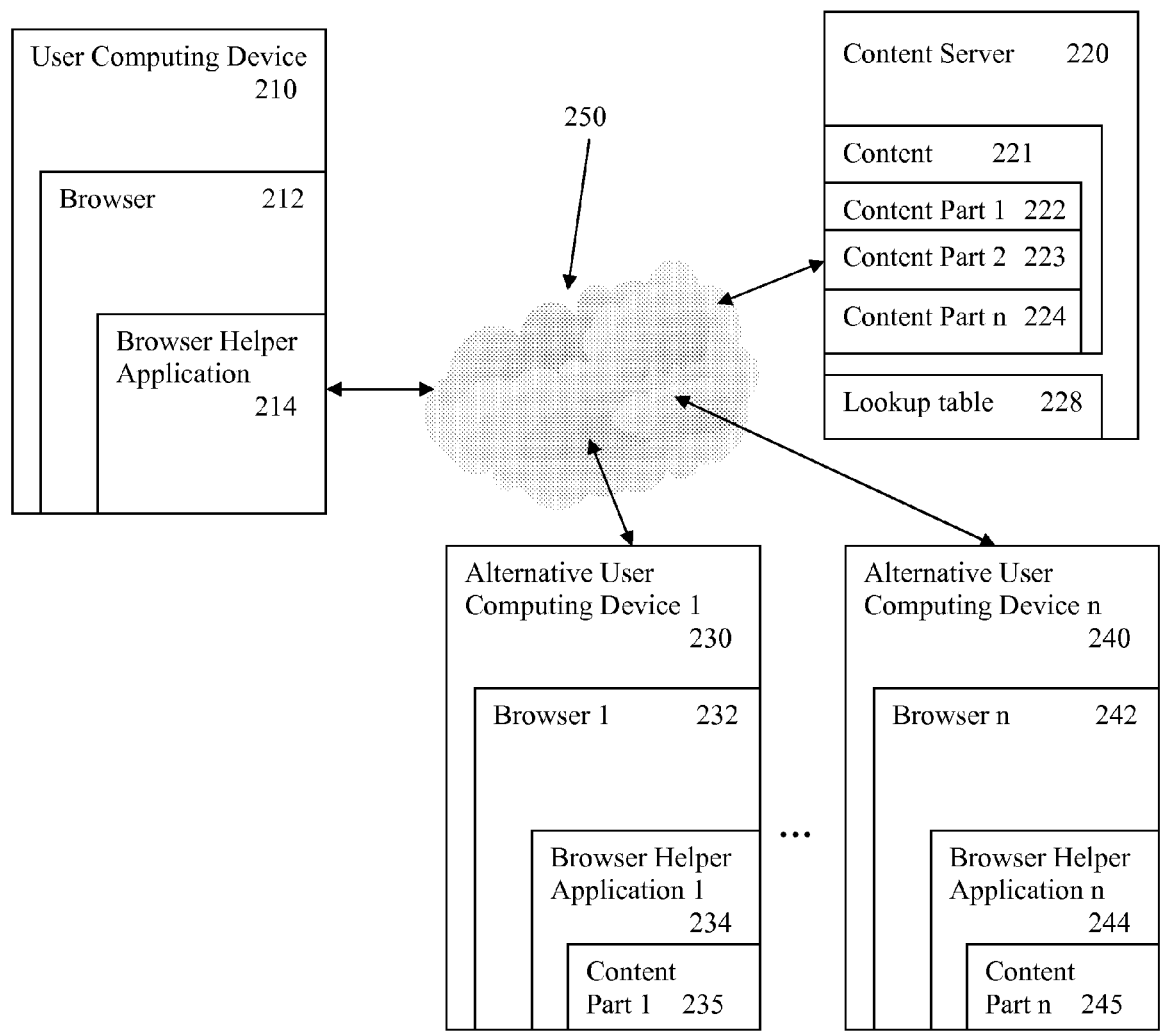
FIG. 2 is a block diagram of a network architecture facilitating the disclosed peer to peer browser content caching system.

FIG. 2 illustrates a network architecture through which the disclosed peer to peer browser content caching system and method can be supported. In FIG. 2, User Computing Device 210, Alternative User Computing Device 230, and Alternative User Computing Device n 240, comprise user computing devices analogous to those describe above with respect to FIG. 1. In FIG. 2, User Computing Device 210 is operated by a user. The user causes an instance of browser 212 to be run by the computing device, and begins browsing one or more network resources available over a communications network 250. Such a communications network may comprise a proprietary network, such as an intranet, a public network, a virtual private network, or combinations thereof. Examples of such communications networks include, without limitation, high-speed wired and wireless communications employing the 802.11 series of standards published by the Institute of Electrical and Electronics Engineers ("IEEE"), cellular telephony, digital data encoded by modulating an analog telephone carrier signal using a modem, or the like. In addition, some or all parts of communications taking place over the communications network may be secured using a variety of secure communications methods including, without limitation, Virtual Private Networking ("VPN"), Secure Sockets Layer ("SSL"), the Advanced Encryption Standard ("AES"), Triple Data Encryption Standard ("3DES"), or the like.

In some embodiments, the functionality associated with content server 220 may be provided by multiple servers to scale the system architecture to meet demand. Furthermore, individual components of server 220, e.g., content 221 and/or lookup table 228, may be provided by a separate server or group of servers.

In some embodiments, the user causes browser helper application 214 to be installed on user computing device 210 and associated with browser 212. Browser helper application 214 can take a variety of forms, including stand-alone software similar to the well-known Yahoo! messenger application, or a browser "plug-in", such as the well-known Yahoo! toolbar. In some embodiments, the functionality associated with browser helper application 214 may be embedded in or otherwise available as part of browser 212.

When browser 212 receives content which is identified as comprising cached content, browser 212 can engage browser helper application 214 to assist in retrieving the cached content. Table 1, below, illustrates exemplary HTML metadata that can be incorporated into a browser interpretable document which indicates to browser 212 that helper application 214 should be engaged. While HTML metadata is one approach to identifying the content as cache enabled content, alternative approaches, including the addition of metadata or content attributes to the content itself, associating a content-enabled flag or other identifier with the content in a content database, or the like may be substituted therefor without departing from the spirit or the scope of the invention.

TABLE 1

```
<span id="832e8333-b92e-5ef2-a873-847389883423">
<a href="large.ppt"> </a></span>
<--    ID: 832e8333-b92e-5ef2-a873-847389883423
       Cdate: Tue Sep 4 10:36:30 PDT 2007
       E: Tue Sep 8 10:36:30 PDT 2007
       Ft: ppt
       M: N
       L: 533445
       P: 6
-->
```

Table 2, below, lists the elements of Table 1 and provides exemplary definitions for the various elements.

TABLE 2

| | |
|---|---|
| ID: <UUID> | Universally Unique Identifier of the content. In some embodiments, it comprises 32 hexadecimal digits. Example: 832e8333-b92e-5ef2-a873-847389883423 |
| Cdate | creation date of the content |
| E | Expiration of content |
| Name (optional) | name of the content |
| ft | file type of the content Example: jpeg, mpeg, gif, ppt, doc, xls |
| M | (N) Non-encrypted (E) Encrypted |
| L | Length of the object in bytes |
| P | Number of parts into which this content is/should be divided |

In some embodiments, a user can configure browser helper application 214 such that, even though cache-enabled content is identified, the content is retrieved from content server 220. In some embodiments, this can be achieved by the user toggling a radio button or other user interface element in a configuration screen associated with browser helper application 214, effectively enabling/disabling browser helper application 214. In some embodiments, the user can configure the enabling/disabling of browser helper application 214 on a site-by-site basis, such that content from certain, user-defined sites is always retrieved directly from the appropriate content server, regardless of whether the metadata or other attributes associated with content retrieved from that content server indicates that the content is cache-enabled.

Figure 3:
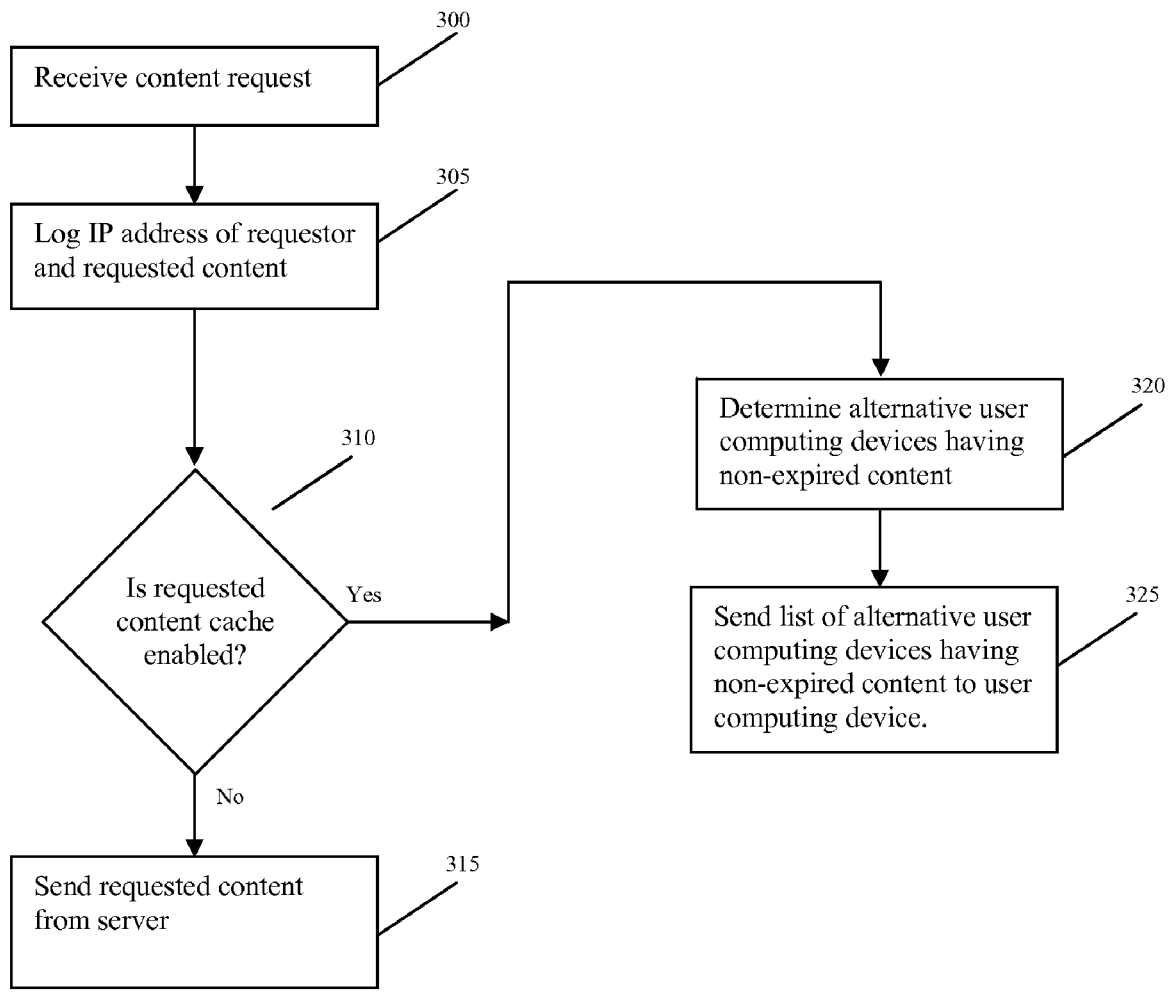
FIG. 3 is a flow chart illustrating an exemplary peer to peer browser content caching method.
Figure 4:
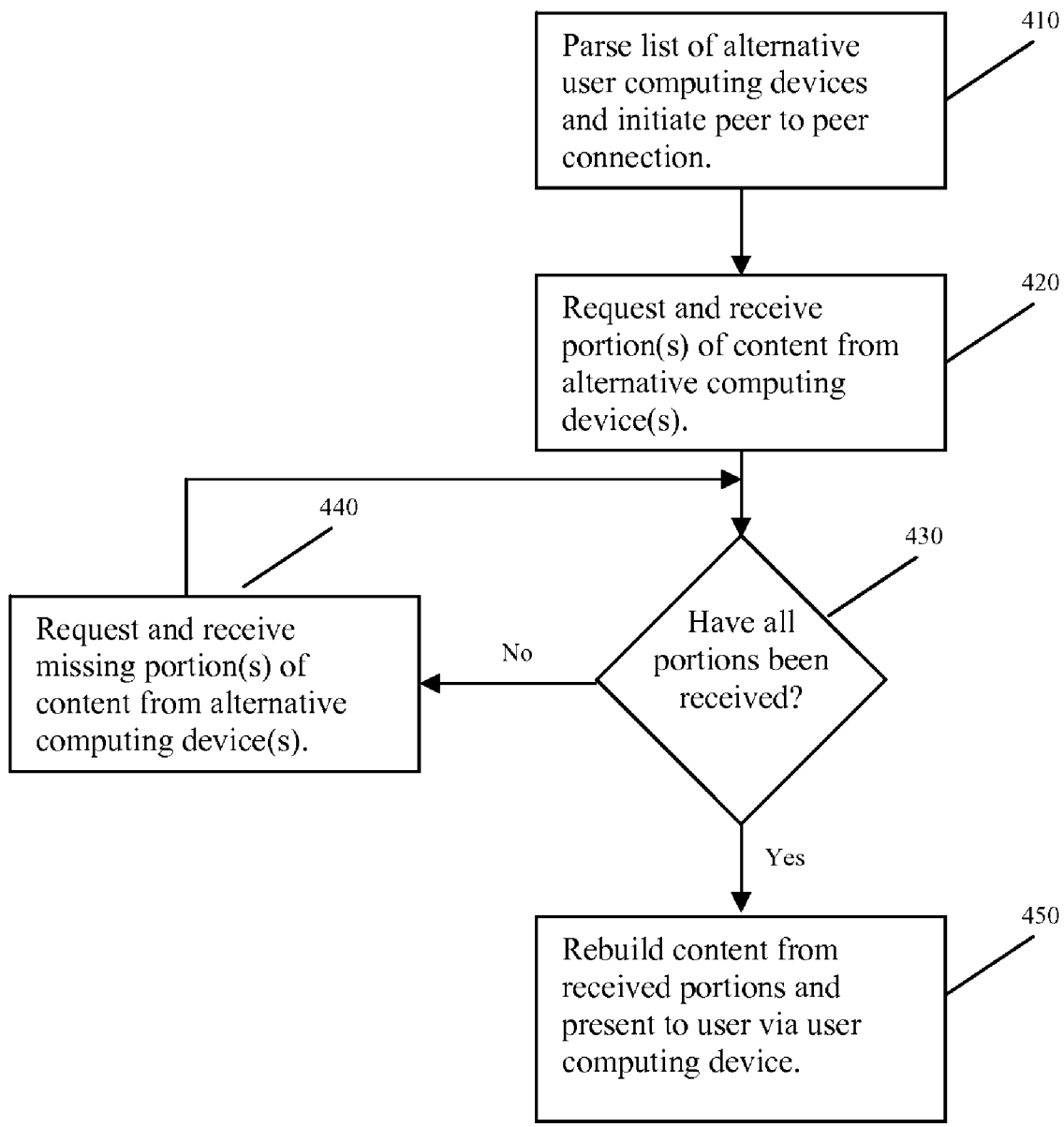

FIG. 3 is a flow chart illustrating an exemplary method through which the architecture of FIG. 2 can be leveraged to facilitate the disclosed peer to peer browser content caching system and method. FIG. 4 is a flow chart illustrating an exemplary method through which the architecture of FIG. 2 can be leveraged to take advantage of the disclosed peer to peer browser content caching system and method. FIGS. 2 and 3 can be seen as interdependent, and the various aspects of FIG. 2 will be described in conjunction with a description of FIGS. 3 and 4.

As the user browses the network resources, browser 212 requests content 221 from at least one of a plurality of content servers 220. Such content servers may comprise, without limitation, servers which provide specific content, such as advertising or video servers, or servers which provide generalized content, such as the well known Yahoo! portal. When content server 220 receives a request for content 221 (block 300 of FIG. 3), content server 220 can log the Internet Protocol address ("IP address") or other unique identifier associated with the requester and the requested content (Block 305) in lookup table 228. In some embodiments, Lookup table 228 comprises a lookup table which cross-references which portion(s) of content 221 have been retrieved by user computing device 210. Lookup table 228 may be stored in one or more database tables stored in a database. Databases can be used to facilitate rapid searching and retrieval of the user information. Database engines capable of storing the user information include, but are not limited to, Microsoft Access or Microsoft SQL Server distributed by Microsoft Corporation of Redmond, Wash., Oracle Database distributed by Oracle Corporation of Redwood Shores, Calif., or MySQL distributed by MySQL Inc. of Cupertino, Calif.

If a content provider, such as, without limitation, the author of content 221 or the person, company, or other entity operating content server 220, has indicated that content 221 should not be cached (Block 310), content 220 is served directly by content server 220 (Block 315). If the content is cache enabled (i.e., no content provider has indicated that the content should not be cached), then content server 220 determines one or more alternative user computing devices 230, 240 having at least a portion of content 221 (Block 320). As described above, in some embodiments a content provider can associate a content expiration period with content 221, and in such embodiments content server 220 may limit the determined set of alternative user computing devices to those having non-expired content or portions thereof. This allows the content provider to ensure that users are receiving reasonably up-to-date content while being able to leverage the advantages of the peer to peer browser content caching system and method described herein.

The set, or list, of determined alternative user computing devices having content 221 or portions thereof is then transmitted to browser 212, where it is interpreted by browser helper application 214 (Block 410 of FIG. 4). In some embodiments, browser helper application 214 may parse the list to identify those alternative user computing devices having specific, user-specified attributes or otherwise falling within the scope of user-defined rules. In some embodiments, default, additional or supplemental rules may be provided by a distributor or provider of browser helper application 214. By way of example, without limitation, a user may note that content retrieved from a specific geographic region, or from a specific IP address is consistently corrupted, and can specify that the specific IP address, and all IP addresses associated with the specific geographic region, are to be dropped from the list. Similarly, in some embodiments, a user can specify to browser helper application 214 that only IP addresses falling within a trusted range, such as those assigned within a corporate firewall, are to be trusted and that all remaining alternative user computing devices are to be ignored. In some embodiments, a user may identify other users whose user computing devices are trusted sources for cached content. By way of example, without limitation, the user may specify to browser helper application 214 that a computing device associated with a member of the user's friends list from an instant messenger program, such as, without limitation, the well-known Yahoo! instant messenger, is a trusted cached content source. In some embodiments, the user may specify that certain content types, such as, but not limited to, JPEG, MP3, and MPEG content should default to being retrieved from alternative user computing devices, if available, but that HTML content should always be retrieved directly from the content server.

In some embodiments, the list of determined alternative user computing devices may further comprise a geolocation attribute for some or all of the alternative user computing devices. By way of example, without limitation, each determined alternative user computing device may also have associated therewith a longitude and latitude, Global Positioning System ("GPS") coordinate, or other position locator. Such a position locator may be implicitly determined based on routing information, signal strength triangulation, or other such information associated with or embedded in the IP address or other identifier associated with the alternative computing device, metadata associated with or embedded in the request from the alternative computing device, or the like. In some embodiments, the user associated with the alternative user computing device may have provided user credentials to a related or third party application running on the alternative user computing device, thereby identifying the user and the likely location from which the user is making the alternative user computing device available. Such geolocation attributes can be used by browser helper application 214 to identify those alternative user computing devices which are physically proximate to user computing device 210. Physically proximate alternative user computing devices can be advantageous, as the number of routing "hops" and the delays associated therewith are minimized, thereby generally increasing the speed with which content can be obtained from the alternative user computing devices.

Although described herein as occurring on user computing device 210, the above-described selection process may also be implemented on content server 220 or otherwise remotely from user computing device 210 without departing from the spirit or the scope of the disclosed system and method.

Once a list of preferred/desired alternative user computing devices is identified, browser helper application 214 can establish connections with one or more of the identified alternative user computing devices 230, 240 (Block 420)

The number of alternative user computing devices 230, 240 with which browser helper application 214 establishes a connection may be determined based on a variety of factors including, without limitation, the bandwidth available to user computing device 210. In some embodiments, the number of connections may be dynamically determined based on the bandwidth at which each of the preceding connections is established, thereby allowing browser helper application 214 to take maximal advantage of the available bandwidth. In some embodiments, the user may limit the total bandwidth available to browser helper application 214.

In some embodiments, browser helper application 214 may establish connections with a plurality of alternative user computing devices 230, 240. In such embodiments, rather than requesting the entirety of content 221 from each alternative user computing device, browser helper application 214 may request different portions of content 221 from each of alternative user computing devices 230, 240.

Browser helper applications 234 and 244 receive the request from browser helper application 214 and can negotiate with browser helper application 214 to determine the maximum bandwidth available to each of browser helper applications 234 and 244. The maximum bandwidth available to each of browser helper application 234, 244 may be determined in advance by a user associated with each such browser helper application, thereby allowing the user to limit the effect of the retrieval of cached content from his or her user computing device. In some embodiments, the maximum bandwidth allocated for serving cached content items may be configured by browser helper application 234 or 244 as a percentage or other function of the maximum bandwidth available to alternative user computing device 230 or 240, respectively. In some embodiments, the maximum available bandwidth is pre-set by a distributor of browser helper application 234, 244 such that serving cached content is likely to have minimal impact on the perceived bandwidth available to a user of alternative user computing devices 230 and/or 240.

Browser helper application 214 can monitor the receipt of the various content parts 235, 246 from alternative user computing devices 230, 240, respectively. If the retrieval of the content from any of the alternative user computing devices slows to an unacceptably low level, browser helper application 214 can close that communication and establish a connection with a new alternative user computing device based on the list of user computing devices from which the content is available, as provided by content server 220. Similarly, if a connection with one or more of the alternative user computing devices is prematurely closed, browser helper application 214 can reestablish the connection or, if the connection cannot be reestablished, browser helper application 214 can establish a connection with a new alternative user computing device from which the content is available. Still further, if all portions of content 221 have not yet been received (Blocked 430), browser helper application 214 can request and receive the missing portion(s) from an alternative computing device 230, 240 (Block 440). In some embodiments, if connections with a pre-set number (e.g., 3) of alternative computing devices fails, the instant system may revert back to obtaining content 221, or any necessary portions thereof, from server 220.

In some embodiments, once all portions of content 221 have been retrieved, the various constituent content parts are reassembled to create content 221 at user computing device 210 (Block 450). The content is then stored on user computing device 210 for later presentation, or presented to the user via user computing device 210. In some embodiments, the portions of content 221 may be received out of sequence. In such embodiments, browser helper application may initiate reconstruction of content 221 even through some portions may not yet be available. This can allow, for example, browser 212 to begin presenting that portion of the content that has been received.

While detailed and specific embodiments of the peer to peer browser content caching system and methods have been described herein, it will be apparent to those skilled in the art that various changes and modifications can be made therein without departing from the spirit and scope of the peer to peer browser content caching system and methods. Thus, it is intended that the present disclosure cover these modifications and variations provided they come within the scope of any appended claims and/or their equivalents.

What is claimed is:

1. A system comprising:
a plurality of processors;
a content module implemented by at least one of said plurality of processors, the content module comprising information concerning where in a network content can be made available, and a lookup table, said information is cached in a content server on the network, the lookup table comprising a set of alternative user computing devices which have requested at least a subset of the plurality of content and a time at which the content was requested by at least a subset of the set of alternative user computing devices, the set of alternative user computing devices providing information corresponding to user-specified attributes and relating to content different from said information comprised within the content module and cached in the content server, at least a subset of the content available from the content server having associated therewith an expiration period; and
a download module implemented by at least one of said plurality of processors for download a browser helper application, the browser helper application capable of receiving a request from a user for content from the content server, wherein based upon analysis of the content server, receiving from the content server at least a subset of the lookup table, parsing the received at least a subset of the lookup table to identify at least one of the plurality of alternative user computing devices having the user-specified attributes from which the requested content is available, the browser helper application being capable of parsing the received at least a subset of the lookup table to remove those alternative content sources having requested the content outside the expiration period, and initiating retrieval of the requested content from the at least one identified alternative user computing devices.

2. The system of claim 1, the first browser helper application further capable of:
receiving a request, from a second browser helper application, for at least a portion of content available from an alternative user computing device and facilitating the transfer of the requested at least a portion of content.

3. The system of claim 1, the lookup table comprising the Internet Protocol address of the set of alternative user computing devices requesting content, and the browser helper application further applying at least one user defined rule to the received at least a subset of the lookup table.

4. The system of claim 3, the user defined rules limiting the set of alternative user computing devices from which content can be requested based on the Internet Protocol address associated with the alternative user computing devices.

5. The system of claim 3, the lookup table further comprising geolocation information associated with at least a subset of the lookup table entries, and the user defined rules limiting the set of alternative user computing devices from which content can be requested based on the geolocation information associated with the alternative user computing devices.

6. A method comprising:
receiving from a user via a browser running on a user computing device a request for content from a content server;
receiving from the content server one or more content identifiers indicating that the requested content is available from at least one alternative user computing device via a peer to peer network and a lookup table comprising a list of alternative user computing devices from which the requested content is available and a time at which the content was requested, at least a subset of the content associated with an alternative user computing device having an expiration period, the list of alternative user computing devices providing information corresponding to user-specified attributes and relating to the content that is different from the content server;
based upon analysis of the content server, parsing the lookup table to select at least one of the alternative user computing devices having the user-specified attributes, said parsing comprising parsing the lookup table to identify removing alternative content sources having requested content outside the expiration period;
requesting at least a portion of the requested content from the selected at least one alternative user computing devices; and
presenting the content received from the at least one alternative user computing device to the user at the user computing device.

7. The method of claim 6, the parsing further comprising applying at least one rule to the lookup table.

8. The method of claim 7, the at least one rule comprising rules based on the geographic location of the alternative user computing devices.

9. The method of claim 7, at least a subset of the at least one rule comprising a user defined rule.

10. The method of claim 7, at least a subset of the at least one rule comprising a rule defined by a provider of the browser helper application.

11. The method of claim 7, the parsing further comprising selecting a plurality of alternative user computing devices, at least a portion of the content being requested from at least a subset of the selected plurality of alternative user computing devices, further comprising:
rebuilding the content from the received content portions.

12. The method of claim 11 further comprising presenting the rebuilt content to the user via the browser running on the user computing device.

13. The method of claim 11, the lookup table comprising only those alternative user computing devices which obtained the requested content less than a fixed period of time ago.

14. The method of claim 11 further comprising requesting at least a portion of the content from the server if at least a portion of the content is unavailable from the at least a subset of the plurality of alternative user computing devices.

15. A non-transitory computer-readable storage medium tangible encoded with computer program process code, the computer program process code comprising instructions interpretable by a processor, the instructions when executed by a computer perform a method comprising:
receiving, by a content server, a content request from a first user computing device;
logging an address of the first user computing device in a lookup table and a time at which the request is received; and
determining whether the requested content is cache enabled and sending the requested content from the content server to the first user computing device if the requested content is not cache enabled, at least a subset of the content available from the content server having associated therewith an expiration period, and, if the requested content is cache enabled:
determining from the lookup table a set of alternative user computing devices having copies of the requested content, the set of alternative user computing devices providing information corresponding to user-specified attributes and relating to the content that is different from the content server, said determining comprises parsing the lookup table to remove alternative user computing devices having requested content outside the expiration period; and
transmitting the set of alternative user computing devices to the first user computing device.

16. The non-transitory computer-readable storage medium of claim 15, at least a subset of the alternative user computing devices in the list of alternative user computing devices having at least one of geolocation information, an Internet Protocol address, and an expiration associated therewith.

17. The non-transitory computer-readable storage medium of claim 16, the set of alternative user computing devices transmitted to the first user computing device containing only those alternative user computing devices whose content has not expired.

18. The non-transitory computer-readable storage medium of claim 15, the set of alternative user computing devices being selected, at least in part, based on the geographic proximity to the user computing device.

* * * * *